United States Patent
Binöder

(10) Patent No.: US 6,604,759 B2
(45) Date of Patent: Aug. 12, 2003

(54) PIPE CONNECTION

(75) Inventor: Harald Binöder, Markt Erlbach (DE)

(73) Assignee: Faurecia Abgastechnik GmbH, Fuerth (DE)

(*) Notice: Subject to any disclaimer, the term of this patent is extended or adjusted under 35 U.S.C. 154(b) by 0 days.

(21) Appl. No.: 09/962,695

(22) Filed: Sep. 24, 2001

(65) Prior Publication Data

US 2002/0130514 A1 Sep. 19, 2002

(30) Foreign Application Priority Data

Sep. 22, 2000 (DE) .................................... 100 47 577

(51) Int. Cl.$^7$ ................................................ F16L 27/04
(52) U.S. Cl. ...................... 285/261; 285/417; 285/146.1
(58) Field of Search .................. 285/51, 146.1, 285/261, 417

(56) References Cited

U.S. PATENT DOCUMENTS

| | | | | | |
|---|---|---|---|---|---|
| 530,917 A | * | 12/1894 | Ames | .......................... | 285/417 |
| 1,772,547 A | * | 8/1930 | Keese et al. | ............. | 285/146.1 |
| 2,363,477 A | * | 11/1944 | Barton | .................... | 285/146.1 |
| 2,381,426 A | * | 8/1945 | Allen et al. | ............... | 285/146.1 |
| 2,516,743 A | * | 7/1950 | ALlin | .......................... | 285/261 |
| 2,556,659 A | * | 6/1951 | Patterson | .................... | 285/261 |
| 2,758,851 A | * | 8/1956 | Heath | .......................... | 285/261 |
| 2,774,618 A | * | 12/1956 | Alderson | .................... | 285/261 |
| 2,821,415 A | * | 1/1958 | Race, Jr. | .................... | 285/417 |
| 3,002,269 A | * | 10/1961 | Hopkins | ..................... | 285/261 |
| 3,396,992 A | * | 8/1968 | Hale | .......................... | 285/51 |
| 4,132,437 A | | 1/1979 | Green | | |
| 4,553,775 A | * | 11/1985 | Halling | ........................ | 285/261 |
| 4,624,489 A | * | 11/1986 | Nakamura | ................... | 285/417 |
| 5,069,487 A | * | 12/1991 | Sheppard | .................... | 285/261 |
| 5,171,042 A | * | 12/1992 | Faidiga | ........................ | 285/51 |
| 5,288,110 A | * | 2/1994 | Allread | | |
| 5,460,416 A | | 10/1995 | Freidrich et al. | | |
| 5,718,462 A | * | 2/1998 | Woods | ......................... | 285/417 |
| 5,806,833 A | * | 9/1998 | Riibe | ......................... | 285/261 |

FOREIGN PATENT DOCUMENTS

| | | | | |
|---|---|---|---|---|
| DE | 296 15 009 U1 | 1/1997 | | |
| FR | 853 931 | 4/1940 | | |
| FR | 2 468 825 | 5/1981 | | |
| GB | 530 965 | 12/1940 | | |
| JP | 5215284 | * | 8/1993 | ................. 285/261 |

* cited by examiner

Primary Examiner—Lynne H. Browne
Assistant Examiner—David E. Bochna
(74) Attorney, Agent, or Firm—Laurence A. Greenberg; Werner H. Stemer; Ralph E. Locher

(57) ABSTRACT

A pipe connection of two pipe ends pushed into a sleeve. The pipe connection includes a spherical shape between the inside wall of the sleeve and the outside wall of at least one pipe end.

16 Claims, 5 Drawing Sheets

PIPE CONNECTION

BACKGROUND OF THE INVENTION

Field of the Invention

The invention is directed to a pipe connection of two pipe ends pushed into a sleeve. Given detachable pipe connections, particularly in the field of the exhaust technology, errors regarding the position, direction or alignment of the pipe ends have a disadvantageous effect. Such errors particularly lead to deviations of position. Given tail pipes of exhaust configurations, for example, these deviations of position are especially undesired when the tail pipe of the exhaust assembly is visibly arranged in a cutout of the back vehicle skirt. The tail pipe or, respectively, the escape opening of the tail pipe then does not lie concentrically in the corresponding cutout of the vehicle skirt, so that the vehicle design is optically impaired, since the observer receives the impression of an incorrectly installed exhaust assembly. Moreover, tail pipes that do not lie concentrically in the cutout of the vehicle skirt can cause a striking noise or such as a result of vibrations.

SUMMARY OF THE INVENTION

Proceeding from these disadvantages, an object of the invention is to fashion a pipe connection such that it is possible, in terms of a correct position, to install the individual pipes forming the exhaust train despite the unavoidable component tolerance. This object is inventively achieved by the pipe combination of two pipe ends pushed into a sleeve according to the invention. The dependent claims partially relate to expedient embodiments of the invention and partially relate to embodiments that are inventive by themselves.

According to the invention, the pipe ends to be connected to one another are pushed into a sleeve. A spherical shape is provided between the outer case of at least one of the two pipe ends. A sub-area of this spherical shape either is adjacent to the outer case of the pipe end or to the inside case of the sleeve. Due to the spherical fashioning of the shape, namely slightly crowned fashioning of the shape, the pipe end provided with the shape or, respectively, the pipe end borne in the region of the shape in the sleeve can be pivoted vis-à-vis the sleeve in the manner of a ball-and-socket joint in a narrow region without the pipe end having to be warped or deformed. It is thus possible to simply compensate a directional error or, respectively, angle error between the pipe ends with respect to the connecting sleeve, since the spherical shape is partially adjacent to the outer case of the pipe end or, respectively, to the inside case of the sleeve across the entire pivot area of the pipe end prescribed by the spherical shape, so that a flush positioning of the outer case of the pipe end is assured at the inside case of the sleeve.

Another feature of the invention refers to the case of a spherical shape in the area of the outer case of a pipe end. This shape is adjacent to the inside case of the sleeve. The spherical shape operates in the manner of a ball-and-socket joint, so that the pipe end, vis-à-vis the sleeve, can be pivoted in a narrow region without the pipe end having to be twisted or deformed. It is thus possible to simply compensate angle errors and directional errors between the pipe ends with respect to the connecting sleeve.

In accordance with yet another feature of the invention that is a cinematic reversal of the previous feature, the pipe ends are the same there as in the prior art, whereas spherical indentations are molded into the sleeve. These spherical indentations protrude in the direction of the outer case of the pipe ends. In the final state of the installation, the pipe end therefore is adjacent with its outer case to the spherical indentation of the sleeve. The spherical indentation, in turn, acts in the manner of a ball-and-socket joint, so that the pipe end, vis-à-vis the inside case of the sleeve, can be pivoted in a narrow region without the pipe end having to be warped or deformed. It is thus possible to simply compensate angle errors and directional errors between the pipe ends with respect to the connecting sleeve.

According to a further feature of the invention, the shape is fashioned as a spherical ring that is slipped onto the pipe end. An extremely high surface quality of the shape can be realized with the assistance of such a sturdy profile ring. In particular, this ring can be extremely exactly rotated round and can be optimized with respect to the surface roughness of the material. Furthermore, an arbitrary material for the ring can replace the normally used sheet material for the pipes. If expensive stainless steel pipes are used, the ring can be produced from another, possibly less expensive material. In accordance with yet another feature of the invention, it is also possible to fashion the sperical ring as a spring ring. A spring ring does not only have a high surface quality of a solid profile ring but is also particularly suitable for compensating the directional errors or, respectively, angle errors as a result of its spring properties.

In accordance with yet a further feature of the invention, a spherical shape is produced with the assistance of a reshaping method. The pipe casing is directly reshaped and calibrated according to one feature of the invention. The advantage of calibration is that pipe ends of exhaust arrangements often go through a calibration process prior to the installation, so that the spherical shape can be co-calibrated here without a further production step being necessary.

The installation of the pipe ends is further facilitated by arranging a spherical shape at both pipe ends according to a further feature of the invention. The pipe ends can be optimally placed vis-à-vis the sleeve. It is also possible to compensate a greater angle error interval in this way.

In accordance with yet another feature of the invention, the spheriodizing [or: molding] of an additional concave acceptance area into the inside case of the sleeve for accepting the respectively allocated spherical shape in the pipe end makes it possible to connect the sleeve and pipe end in a form-fitting manner. In this case, the acceptance area in the sleeve adapted to the spherical recess acts as a positioning aid in axial direction and as a measure for improving the gastightness of the connection.

According to another feature of the invention, the sleeve and the pipe end can be connected such that the leak rate of a so manufactured exhaust arrangement is as low as possible. This embodiment systematically is further developed in accordance with a further feature of the invention according to which the pipe clip is congruently arranged with respect to the spherical recess in the final state of installation in order to further increase the efficiency of the pipe clip.

In accordance with yet another feature of the invention, the production of the connection is facilitated in that marking warts or marking indents are attached. The marking warts attached to the pipe ends, as it were, serve as a limit stop for the opening edge of the sleeve or, respectively, the marking indents serve as an optical installation aid. During the installation process, it thus can be promptly seen from outside when the pipe end is completely pushed into the sleeve and the pipe end has reached its intended final state of installation vis-à-vis the sleeve.

A further feature of the invention represents a mixture of the invention with a spherical recess in the sleeve for pivotably bearing and connecting a traditional hollow cylindrical pipe end on the one side of the pipe connection and with a pipe end having a spherical recess on the other side of the pipe connection without a recess in the sleeve. Certainly, each side of this connection can be further developed according to one of the other claims. Therefore, all conceivable mixtures of the different embodiments are possible without further ado.

DESCRIPTION OF THE PREFERRED EMBODIMENTS

Figure 1:
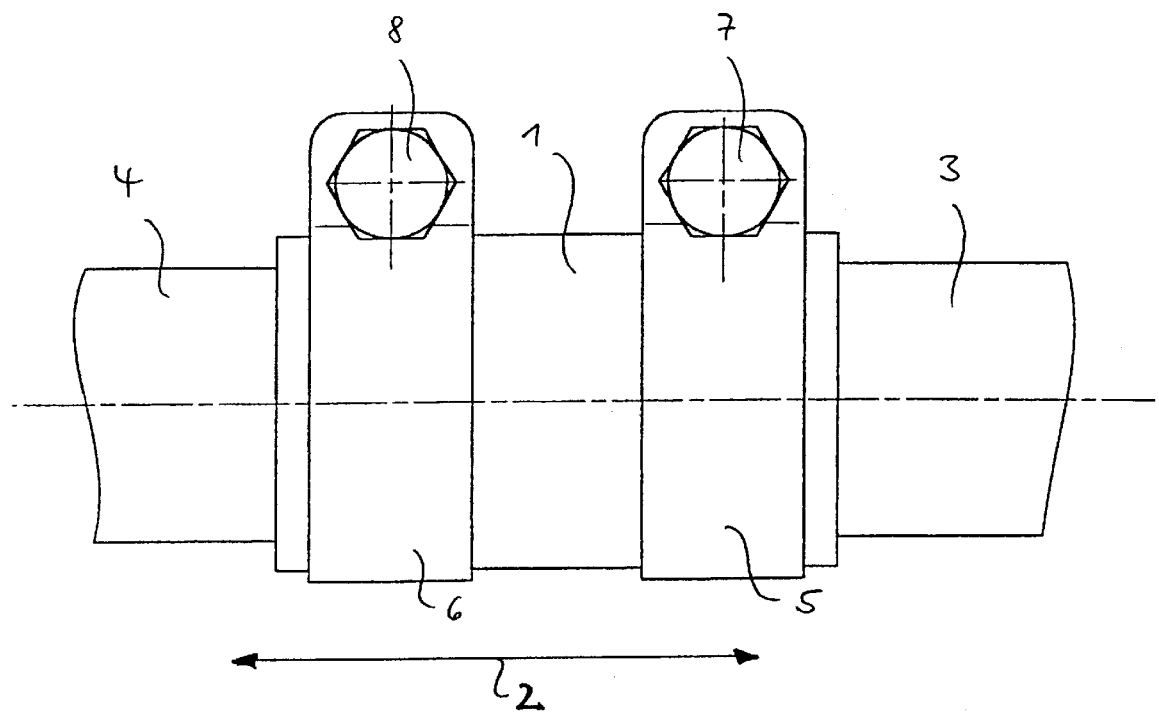
FIG. 1 shows a side view of the inventive pipe connection.

Referring now to the figures of the drawings in detail and first, particularly to FIG. 1 thereof, there is shown [FIG. 1 shows] two pipe ends 3, 5 protruding from a sleeve 1 in a longitudinal direction. A pipe clip 5, 6, which can be prestressed by a straining screw 7, 8, secures the pipe ends 3, 4 regarding their position in the sleeve 1.

Figure 2:
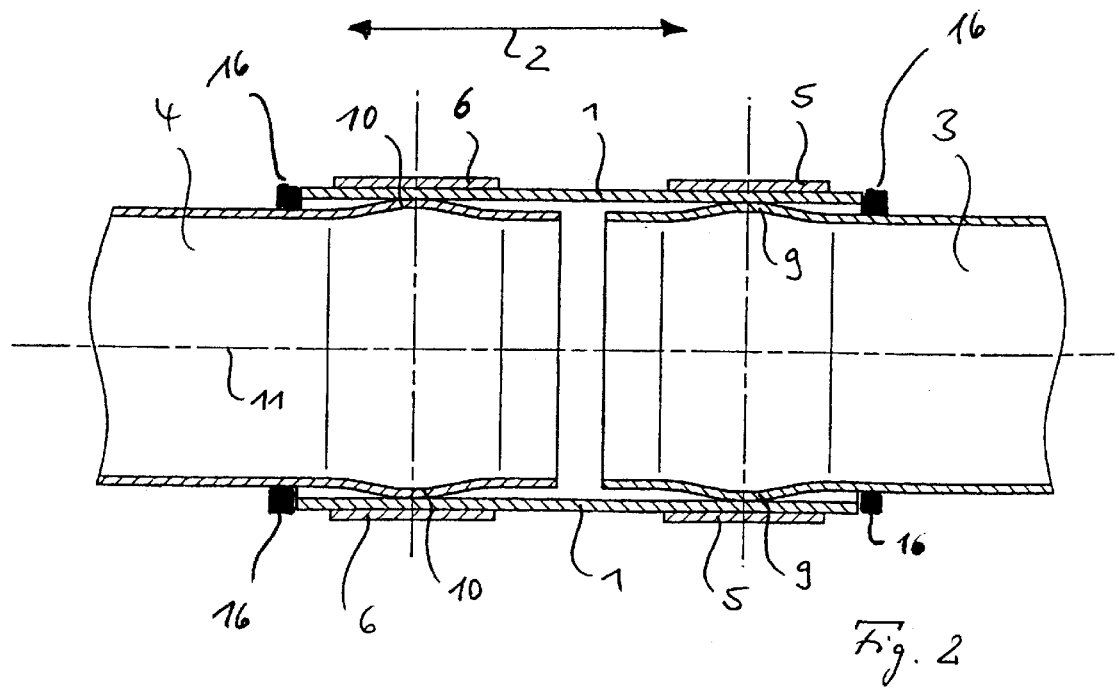
FIG. 2 shows a cross-sectional view of the pipe connection shown in FIG. 1.

FIG. 2 shows the spherical shapes 9, 10 molded into the pipe ends 3, 4 in the exemplary embodiment, whereby said spherical shapes 9, 10 are convexly fashioned in the exemplary embodiment. The spherical shapes 9, 10 extend around the entire circumference of the pipe ends 3, 4. FIG. 2 shows the fact that the pipe ends 3, 4, only with their spherical shapes, are adjacent to the inside case of the cylindrical sleeve 1.

Therefore, the invention makes it possible to keep the originally used sleeve 1 and the originally used pipe clips 5, 6. This is particularly advantageous with respect to the automobile manufacture wherein the pipe clips 5, 6, regarding their size, are constructively adapted to the underbody of the vehicle, so that it is possible to promptly use the inventive pipe connection without further constructive changes.

Figure 3:
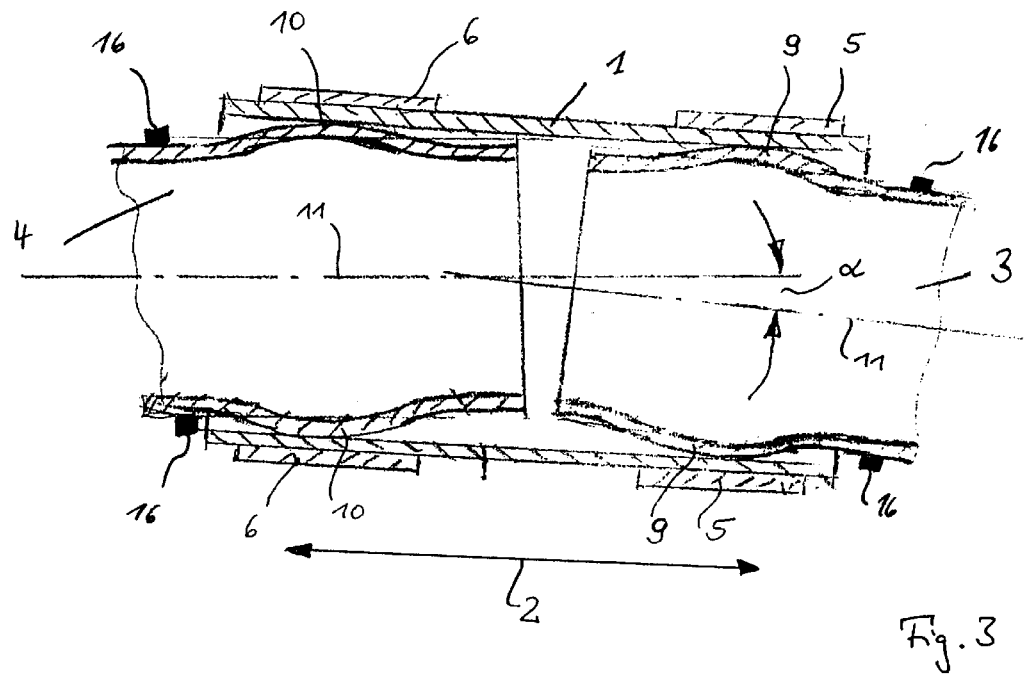
FIG. 3 shows a representation according to FIG. 2 with pipe ends having a clearly recognizable angle offset against one another.

While the representation of FIG. 2 shows the ideal case of two pipe ends 3, 4 in alignment with one another concerning their central longitudinal axis 11 of the pipe, FIG. 3 shows an arrangement of a pipe connection having the same construction, however, said arrangement has pipe ends 3, 4 that respectively have an angle error against one another. FIG. 3 shows the fact that the central longitudinal axis 11 of the pipe of the pipe end 4 (shown left in the drawing) does not extend parallel to the longitudinal direction 2. The central longitudinal axis 11 of the pipe of the pipe end 3 (shown right in the drawing) does not extend parallel to the longitudinal direction 2 either. Furthermore, the central longitudinal axes 11 of both pipe ends 3, 4 are not parallel either but exhibit an angle error against one another, whereby said angle error corresponds to the angle α. The pipe ends 3, 4 do not have to be shaped in order to be placed into the sleeve 1. Rather, the representation of FIG. 3 shows that the pipe ends 3, 4, vis-à-vis the longitudinal direction 2, are tiltably placed into the sleeve 1. Despite the angle error corresponding to the angle α, a flush positioning of the pipe ends 3, 4, with their spherical shapes 9, 10, is assured at the inside case of the sleeve 1 and said pipe ends are also fixed at the sleeve with the assistance of the pipe clips 5, 6, without being warped or deformed vis-à-vis the sleeve 1.

Figure 4:
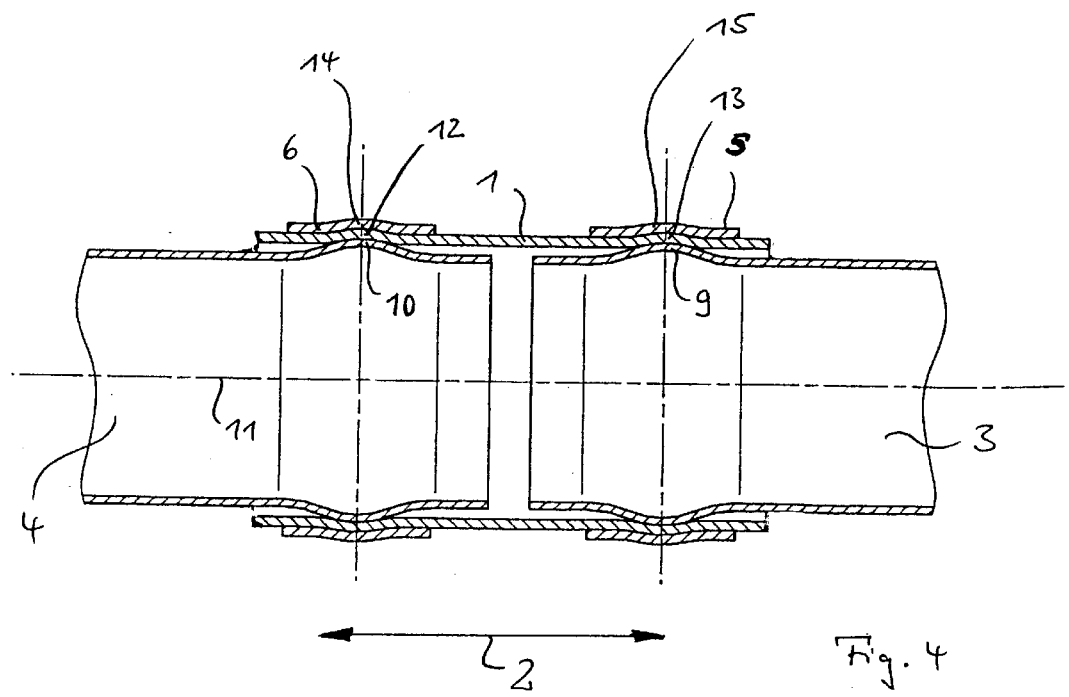
FIG. 4 shows a cross-sectional side view of an alternative embodiment of the pipe connection with concave acceptance areas in the area of the inside case of the sleeve.

FIG. 4 shows an exemplary embodiment of the pipe connection with a further reduced leak rate of the construction. In this embodiment, the sleeve 1 has two concave acceptance areas 12, 13, which are adapted to the convex, spherical shapes 9, 10 in the pipe ends 3, 4, so that the spherical shape 9, in the final state of the installation, lies in the concave acceptance area 13 or, respectively, that the spherical shape 10 lies in the concave acceptance area 12. Finally, the pipe clips 5, 6 are also provided with corresponding spherical bends [or: flections] 14, 15.

In FIGS. 2 and 3, marking warts 16 are also attached to the pipe ends 3, 4. In FIG. 2, these marking warts 16 act as a limit stop with respect to the edges of the sleeve 1. In FIG. 3, the marking warts only represent optical position aids which can also be fashioned as marking notches or such like.

Figure 5:
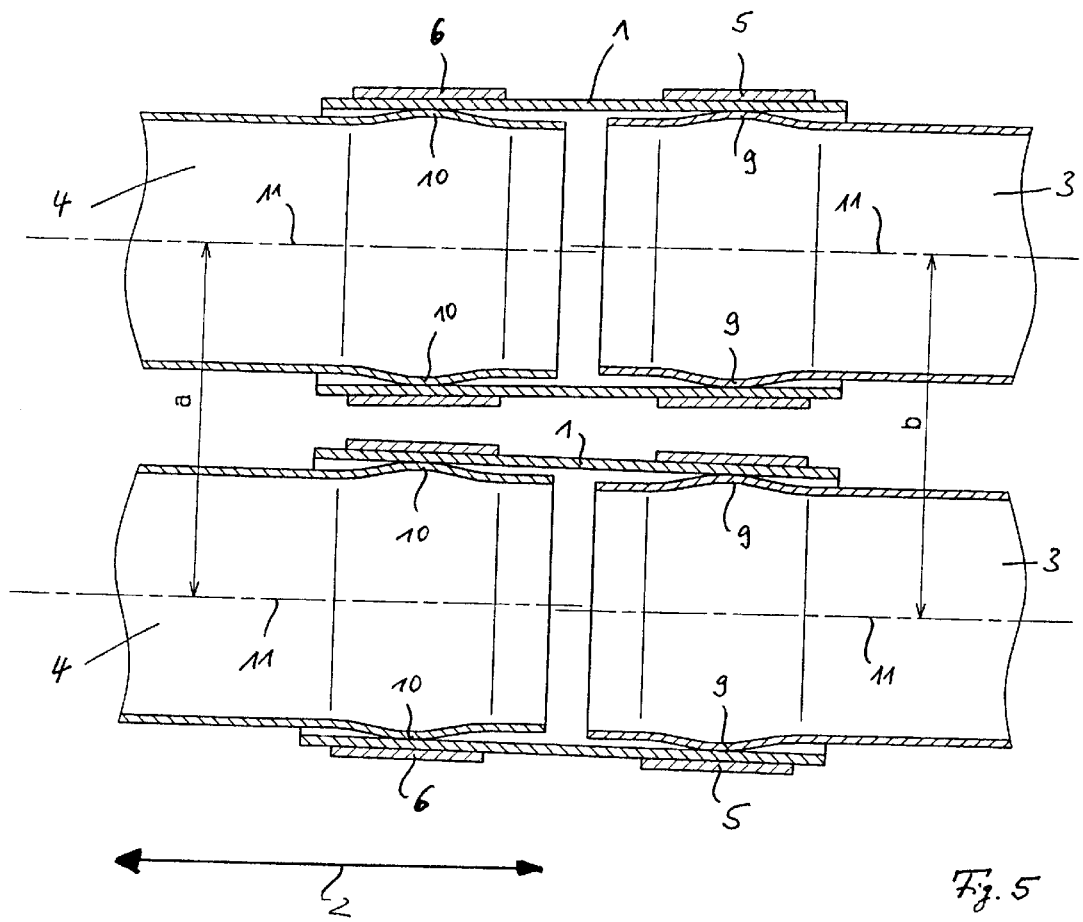
FIG. 5 shows a cross-sectional side view of a pipe connection of a bifurcated pipe with two parallel pipe ends.

FIG. 5 shows another embodiment of the pipe connection for connecting a bifurcated pipe to two parallel pipe ends. The left half of FIG. 5 shows the two pipe ends 4 of a bifurcated pipe (not shown in greater detail). These pipe ends have the bifurcated pipe axis distance a with respect to their central longitudinal axes 11 of the pipe. Analogous to the exemplary embodiment in FIG. 2, the bifurcated pipe ends 4 are respectively pushed into a sleeve 1 and are respectively fixed by a pipe clip 6. The right half of FIG. 2 shows the pipe ends 3 of the two pipes to be connected to the bifurcated pipe ends 4. These pipes can also be a double-flow pipe unit but can also be individual pipes. The pipe ends 3 have the axis distance b with respect to their central longitudinal axes 11. In the exemplary embodiment shown in FIG. 5, the axis distance a of the bifurcated pipe is less than the axis distance b, of the pipe ends 3 to be connected to the bifurcated pipe. The different axis distances a and b, in turn, can be compensated via the spherical shapes 9, 10 at the pipe ends 3, 4. On the basis of the invention, it is also possible to compensate the angle offset of pipe ends and an offset with respect to the axis distance of pipe ends vis-à-vis bifurcated pipes. Longitudinal tolerances in axial direction can also be compensated by different installation positions.

Figure 6:
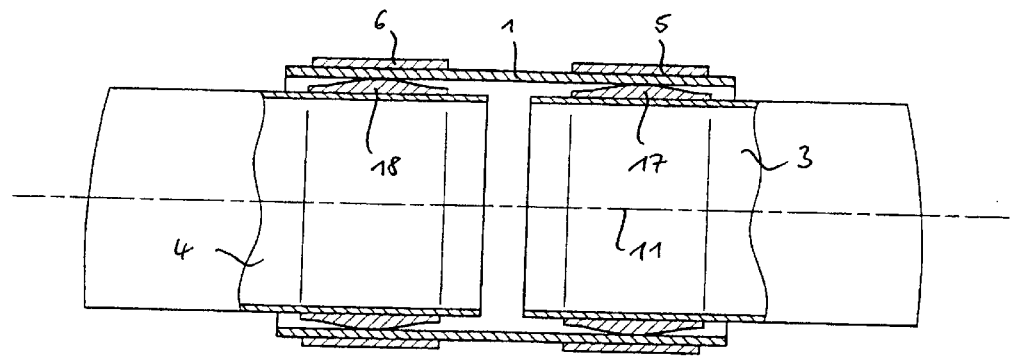
FIG. 6 shows a cross-sectional view of the pipe connection shown in FIG. 1 with profile rings as a spherical shape.

FIG. 6 basically shows the same arrangement as FIG. 2, so that identical parts have identical reference numbers. In contrast to the exemplary embodiment shown in FIG. 2, spherical shapes are not molded into the pipe ends. Rather, the spherical shapes are formed by spherical profile rings 17, 18 which are slipped onto the pipe ends 3, 4. In the exemplary embodiment, the spherical profile rings 17, 18 carry spherical shapes convexly projecting out to the outside in the direction of the sleeve 1. The functioning is the same as the one of the shapes 9, 10 molded into the pipe ends given the exemplary embodiment of FIG. 2.

Figure 7:
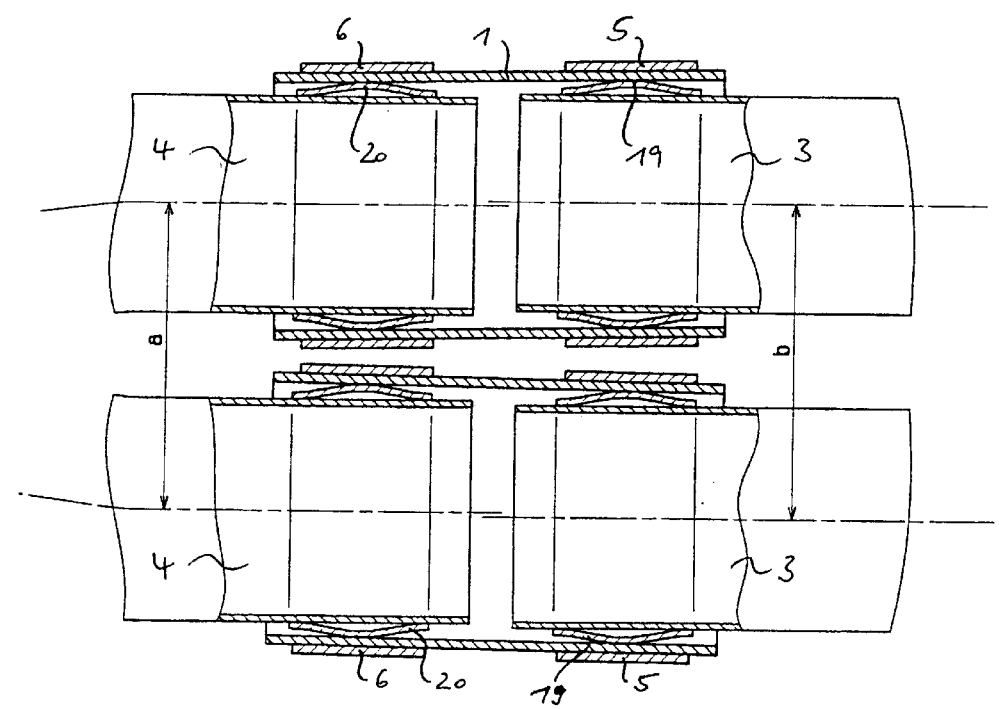
FIG. 7 shows a side view according to FIG. 5 with spring rings as a spherical shape.

Analogous to FIG. 5, FIG. 7 shows the connection of a bifurcated pipe with its bifurcated pipe ends 4 with pipe ends 3, whereby the bifurcated pipe distance a, in turn, is less than the axis distance b of the pipe ends 3. Spherical rings, in turn, are slipped onto the pipe ends 3. Contrary to the exemplary embodiment of FIG. 6, these are not spherical rings composed of solid material, therefore are not profile rings 17, 18 but are spherical spring rings 19, 20 borne on the pipe ends 4 with their spring power. These spring rings 19, 20 have the advantage to help compensate angle errors and positional errors as a result of their spring property.

Figure 8:
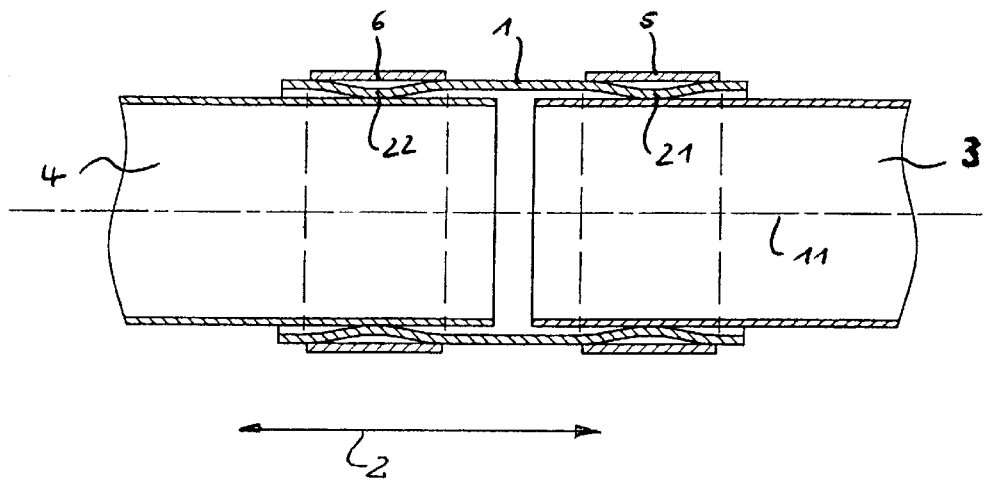
FIG. 8 shows a cross-sectional side view of an embodiment with spherical indentations in the sleeve.
Figure 9:
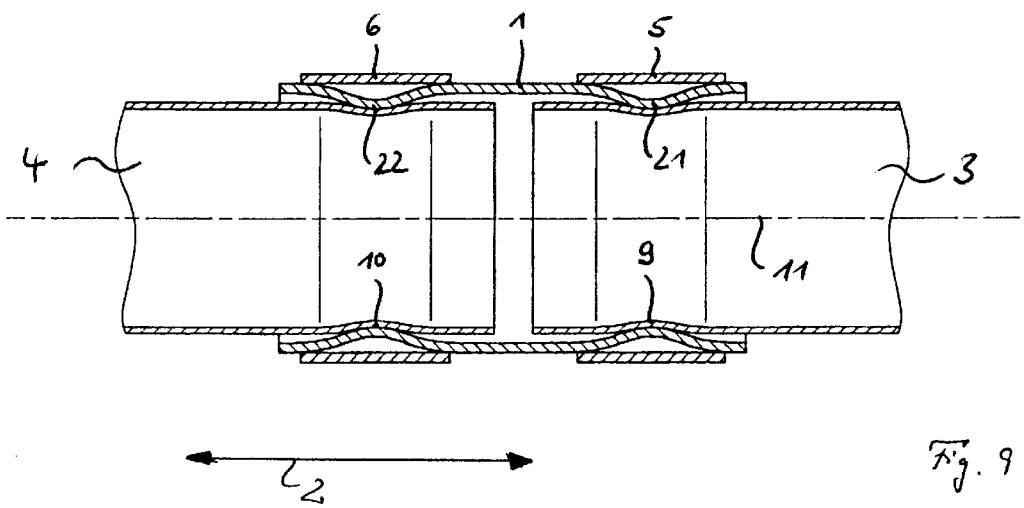
FIG. 9 shows a side view according to FIG. 8 with additional concave spherical shapes in the pipe ends.

FIGS. 8 and 9 show another embodiment of the invention wherein the sleeve 1 is provided with concave, spherical indentations 21, 22. In the exemplary embodiment shown in FIG. 8, the pipe ends 3, 4 and the pipe clips 5, 6 are cylindrically fashioned. The spherical shapes are inserted into the sleeve 1, so that a flush positioning of the pipe ends 3, 4, in this exemplary embodiment, is given only in the area of the spherical indentations 21, 22 with respect to the sleeve 1. On the basis of this exemplary embodiment, it is possible to keep the pipe clips 5, 6 as well as the conventional pipes and to compensate alignment, angle or positional errors with the assistance of the spherical indentations 21, 22.

FIG. 9 shows a further development of the exemplary embodiment of FIG. 8. Not only the sleeve 1 has spherical indentations 21, 22 but a spherical shape 9, 10 is molded into the inside case of each pipe end 3, 4, whereby said spherical shape, analogous to the concave spherical indentation 21, 22, is concavely fashioned in the exemplary embodiment of FIG. 9.

To be complete, it should be mentioned that mixtures are also possible, so that the exemplary embodiments shown in FIGS. 1 to 9 can be arbitrarily combined. This has the advantage that—where it is desired—the pipe ends 3, 4 of conventional pipes can be kept, whereas pipe ends 3, 4 having convex (FIG. 2) or concave (FIG. 9) spherical indentations 9, 10 can be inserted at a different location.

| Reference character list | |
|---|---|
| | sleeve |
| | longitudinal direction |
| | pipe end |
| | pipe end |
| | pipe clip |
| | pipe clip |
| | straining screw |
| | straining screw |
| | spherical shape |
| | spherical shape |
| | central longitudinal axis of the pipe |
| | concave acceptance area |
| | concave acceptance area |
| | spherical bend |
| | spherical bend |
| | marking wart/marking notch |
| | spherical profile ring |
| | spherical profile ring |
| | spherical spring ring |
| | spherical spring ring |
| | spherical indentation |
| | spherical indentation |
| α | angle |
| a | axis distance of the bifurcated pipe |
| b | axis distance |

I claim:

1. A pipe connector for receiving at least two pipe ends, each of the pipe ends having a pipe wall and a pipe connection point, the pipe connector comprising:
   a sleeve for receiving the at least two pipe ends;
   said sleeve having:
      a sleeve connection point for each of the at least two pipe ends; and
      a sleeve wall formed to receive a respective pipe wall of the at least two pipe ends at a pipe-sleeve connection point disposed between corresponding ones of said sleeve connection point and the pipe connection point;
   a spherical portion disposed on at least one of:
      said sleeve connection point;
      the pipe connection point; and
      said pipe-sleeve connection point; and
   a pipe clip for each of the at least two pipe ends, said pipe clip fastening a respective one of the at least two pipe ends in said sleeve, said pipe clip being congruently disposed with respect to said spherical portion in a final state of installation of said sleeve and the at least two pipe ends.

2. The pipe connector according to claim 1, wherein:
   the pipe wall of each of the at least two pipe ends has an outer circumference; and
   said spherical portion is disposed at the pipe connection point of at least one of the at least two pipe ends.

3. The pipe connector according to claim 2, wherein said spherical portion is molded into the wall of each of the at least two pipe ends.

4. The pipe connector according to claim 3, wherein said spherical portion is calibrated into the pipe wall of each of the at least two pipe ends.

5. The pipe connector according to claim 1, wherein said spherical portion is a spherical indentation disposed at said sleeve connection point on said sleeve.

6. The pipe connector according to claim 1, wherein said spherical portion is a spherical ring slidably disposed on each of the at least two pipe ends at said pipe-sleeve connection point.

7. The pipe connector according to claim 1, wherein:

the pipe wall of each of the at least two pipe ends has an outer circumference; and said spherical portion is disposed at the pipe connection point of each of the at least two pipe ends.

8. The pipe connector according to claim 7, wherein:

said sleeve wall has an inside; and said sleeve has said spherical portion disposed at said sleeve connection point molded into said inside of said sleeve wall for accepting the spherical portion of a respective one of the at least two pipe ends.

9. The pipe connector according to claim 8, wherein said spherical portion is a concave acceptance area.

10. The pipe connector according to claim 1, wherein the pipe wall of each of the at least two pipe ends has at least one of marking warts and marking notches.

11. The pipe connector according to claim 10, wherein the pipe wall is the outer wall of the at least two pipe ends.

12. The pipe connector according to claim 1, wherein:

a first of the at least two pipe ends has a pipe wall with said spherical portion; and said sleeve wall has a spherical indentation disposed at a point connecting said sleeve connection point to the pipe connection point of the second of the at least two pipe ends.

13. The pipe connector according to claim 12, wherein the first of the at least two pipe ends has an outer wall with said spherical portion.

14. The pipe connector according to claim 1, wherein said spherical portion is part of said sleeve.

15. The pipe connector according to claim 1, wherein said spherical portion is part of each of the at least two pipe ends.

16. The pipe connector according to claim 1, wherein said spherical portion is a separate piece disposed between said sleeve and each of the at least two pipe ends.

* * * * *